United States Patent
Al-Raqadi (10) Patent No.: US 9,107,542 B1
(45) Date of Patent: Aug. 18, 2015

(54) FOOD SKEWERING MACHINE (71) Applicant: SULTAN QABOOS UNIVERSITY, Muscat (OM)

(72) Inventor: Muadh K. Al-Raqadi, Al Khodh (OM)

(73) Assignee: SULTAN QABOOS UNIVERSITY, Muscat (OM)

( * ) Notice: Subject to any disclaimer, the term of this patent is extended or adjusted under 35 U.S.C. 154(b) by 0 days.

(21) Appl. No.: 14/532,869

(22) Filed: Nov. 4, 2014

(51) Int. Cl.
A47J 37/07 (2006.01)
A47J 43/18 (2006.01)

(52) U.S. Cl.
CPC .................................... A47J 43/18 (2013.01)

(58) Field of Classification Search
CPC ..... A47J 37/041; A47J 37/042; A47J 37/043; A47J 43/18; A47J 37/0623
USPC ......... 99/419, 430, 421 R, 450.2, 450, 450.1, 99/523; 426/421, 274, 518, 567
See application file for complete search history.

(56) References Cited

U.S. PATENT DOCUMENTS

| 3,405,422 | A |   | 10/1968 | Sico et al. | |
|---|---|---|---|---|---|
| 3,433,151 | A |   | 3/1969 | Farran et al. | |
| 4,170,933 | A | * | 10/1979 | Meamber | 99/349 |
| 4,352,242 | A |   | 10/1982 | Plet | |
| 4,429,435 | A | * | 2/1984 | Walls | 99/419 |
| 4,837,895 | A | * | 6/1989 | Emsens | 99/419 |
| 4,893,553 | A | * | 1/1990 | Emsens | 99/419 |
| 5,669,290 | A | * | 9/1997 | Natsumi et al. | 99/421 H |
| 6,161,471 | A |   | 12/2000 | Emsens | |
| 6,789,468 | B2 |   | 9/2004 | Rosen | |
| 2004/0187701 | A1 | * | 9/2004 | Oi | 99/419 |
| 2007/0131348 | A1 | * | 6/2007 | Nakajima et al. | 156/272.8 |
| 2012/0186461 | A1 | * | 7/2012 | Carson | 99/421 H |
| 2012/0225174 | A1 |   | 9/2012 | DeAlto | |
| 2013/0104744 | A1 |   | 5/2013 | Oi | |

FOREIGN PATENT DOCUMENTS

| CN | 203313980 | 12/2013 |
|---|---|---|
| FR | 2550076 | 2/1985 |

* cited by examiner

*Primary Examiner* — Tu B Hoang
*Assistant Examiner* — Phuong Nguyen
(74) *Attorney, Agent, or Firm* — Richard C. Litman (57) ABSTRACT

The food skewering machine includes a base and a food holding tray that is removably installed within the base. The tray includes two portions that are hingedly attached together. Each portion of the tray includes a series of receptacles for holding meat or other foods to be skewered when the two hinged portions are closed. A skewer driver can travel back and forth along the length of the base to drive or push skewers into the tray, thereby skewering the contents of the receptacles within the tray. The food holding receptacles within the tray may include any practicable number and are arranged in rows to provide for the simultaneous skewering of food using multiple skewers. Each row has a plurality of receptacles therein to allow each skewer to impale a plurality of food elements during a single skewering operation.

17 Claims, 8 Drawing Sheets

FOOD SKEWERING MACHINE

BACKGROUND OF THE INVENTION

1. Field of the Invention

The present invention relates generally to devices for use in the culinary arts, and particularly to a food skewering machine providing for the simultaneous skewering of a plurality of pieces of meat, vegetables, and/or other foods suitable for skewering.

2. Description of the Related Art

Skewered foods, e.g., kabobs or kebabs and the like, are quite popular in many ethnic cuisines. While various meats are generally considered when kebabs or the like are made, many other foods, such as vegetables and virtually any pieces of food with sufficient body to remain as single solid pieces during the skewering and cooking process, are often used in the making of such cuisine.

The basic concept of skewering meat and/or other foods for cooking is a relatively simple one. The process of holding a single skewer with one hand while forcing the food element onto the skewer with the other hand is well known. While this manual process serves the purpose, it does have its drawbacks. One problem with this manual process is that it can be somewhat hazardous due to the sharpened skewer. It can be difficult to force relatively firm cuts of meat or firm vegetables onto the skewer, and it is quite easy to make a slight slip and injure the hand on the sharpened skewer during the skewering operation. Also, this manual process is relatively slow. Kabobs or other skewered foods are often made for large gatherings, where the making of a large number of such skewered foods is required. The preparation of a large number of such skewered foods one at a time by hand is time consuming and can be quite tiring when relatively firm and/or tough foods are being used.

Some devices for the skewering of various foods have been developed in the past. Many of these devices required some source of motive power to facilitate the operation, e.g., an electric motor to force the skewers through the food elements or to force the food elements onto the skewers. Such powered devices tend to be relatively costly, and at the very least require a source of power for their operation. Electrical or other power is often not available in more casual outdoor settings where skewered foods are often prepared and served. Other manually operated skewering devices have also been developed, but these tend to be relatively complex as well.

Thus, a food skewering machine solving the aforementioned problems is desired.

SUMMARY OF THE INVENTION

The food skewering machine includes a base and a food holding tray that can be removably installed within the base. The tray includes two portions that are hingedly attached together. The two portions of the tray are essentially mirror images of one another. Each portion of the tray includes a series of receptacles for holding meat or other foods to be skewered when the two hinged portions are closed. A skewer driver can travel back and forth along the length of the base to drive or push skewers into the tray, thereby skewering the contents of the receptacles within the tray.

The food holding receptacles within the tray may include any practicable number and are arranged in rows to provide for the simultaneous skewering of food using multiple skewers. Each row has a plurality of receptacles therein to allow each skewer to impale a plurality of food elements during a single skewering operation.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The food skewering machine 10 is a manually operated device that enables a user to form multiple kebabs or the like simultaneously. The basic components of the food skewering machine 10 are illustrated in FIGS. 1 and 2 of the drawings, with FIGS. 3 through 8 illustrating the machine 10 in its entirety.

Figure 1:
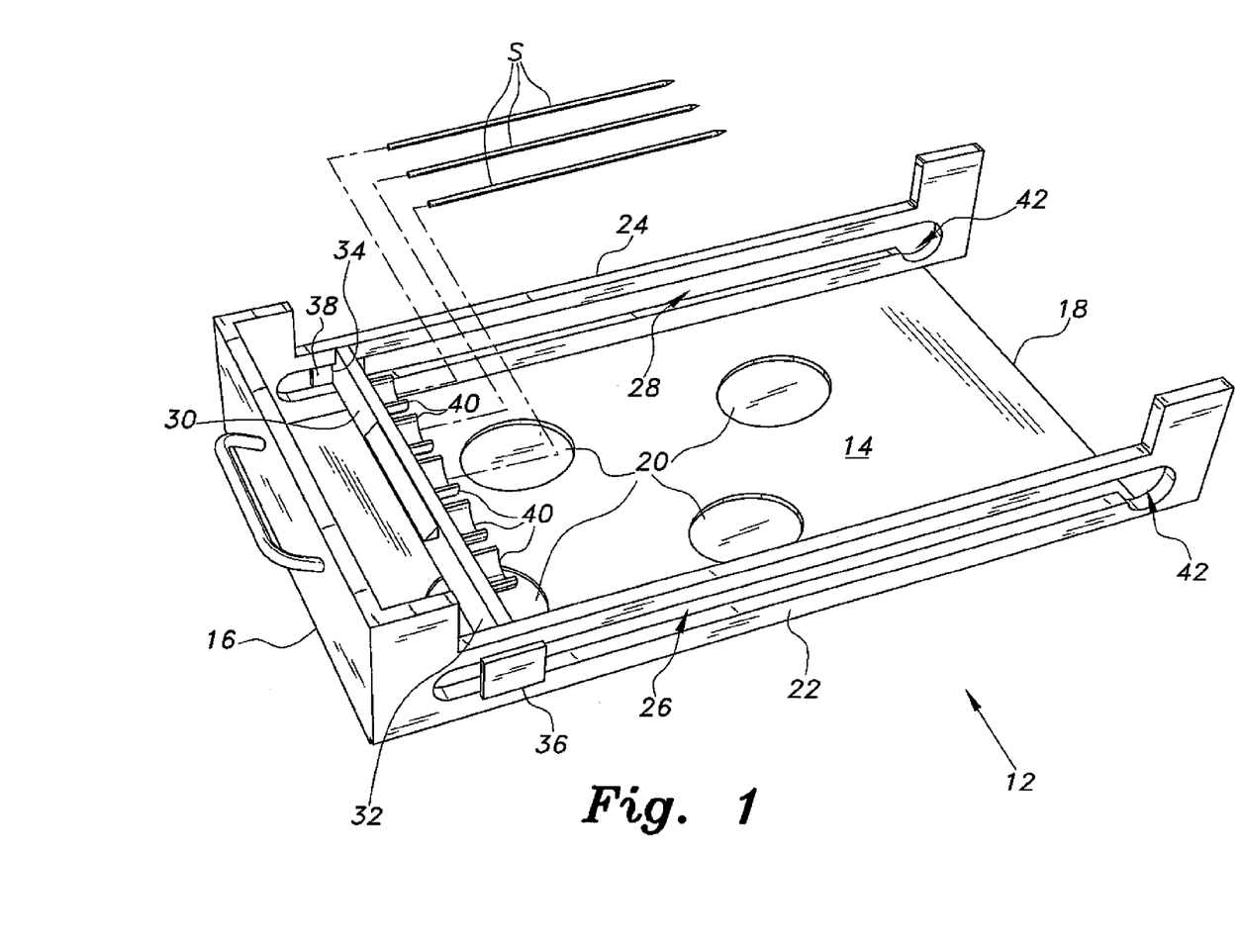
FIG. 1 is a perspective view of the base component of a food skewering machine according to the present invention illustrating its general features, with a plurality of skewers illustrated therewith.

FIG. 1 of the drawings provides a detailed perspective view of the base 12 of the machine. The base 12 supports a tray 100 (shown separately in FIG. 2) that holds the pieces of food for skewering during operation of the machine. The base 12 has a floor 14 with a handle end 16 and an opposite tray end 18. The floor 14 may contain a series of liquid capture receptacles 20 therein. Mutually opposed first and second lateral walls 22 and 24 extend along the opposite lateral edges of the floor 14. Each of the walls 22 and 24 has a skewer driver guide slot, respectively 26 and 28, formed therealong.

A skewer driver 30 extends laterally across the base 12 between the two walls 22 and 24. The skewer driver 30 has mutually opposed first and second ends 32 and 34 that engage the respective guide slots 26 and 28, with the ends of the skewer driver 30 sliding along the slots 26 and 28 during operation of the food skewering machine 10. First and second keepers or retainers 36 and 38 extend from the respective ends 32 and 34 of the skewer driver 30 and ride along the outer surface of the respective walls 22 and 24 to retain the skewer driver 30 in place between the two walls. The skewer driver 30 includes a plurality of skewer rests 40 extending therefrom and oriented toward or in the direction of the tray end 18 of the base 12. Each of the skewer rests 40 comprises an upwardly open concave semicylindrical seat, allowing the blunt end of a skewer S to be placed therein.

Figure 2:
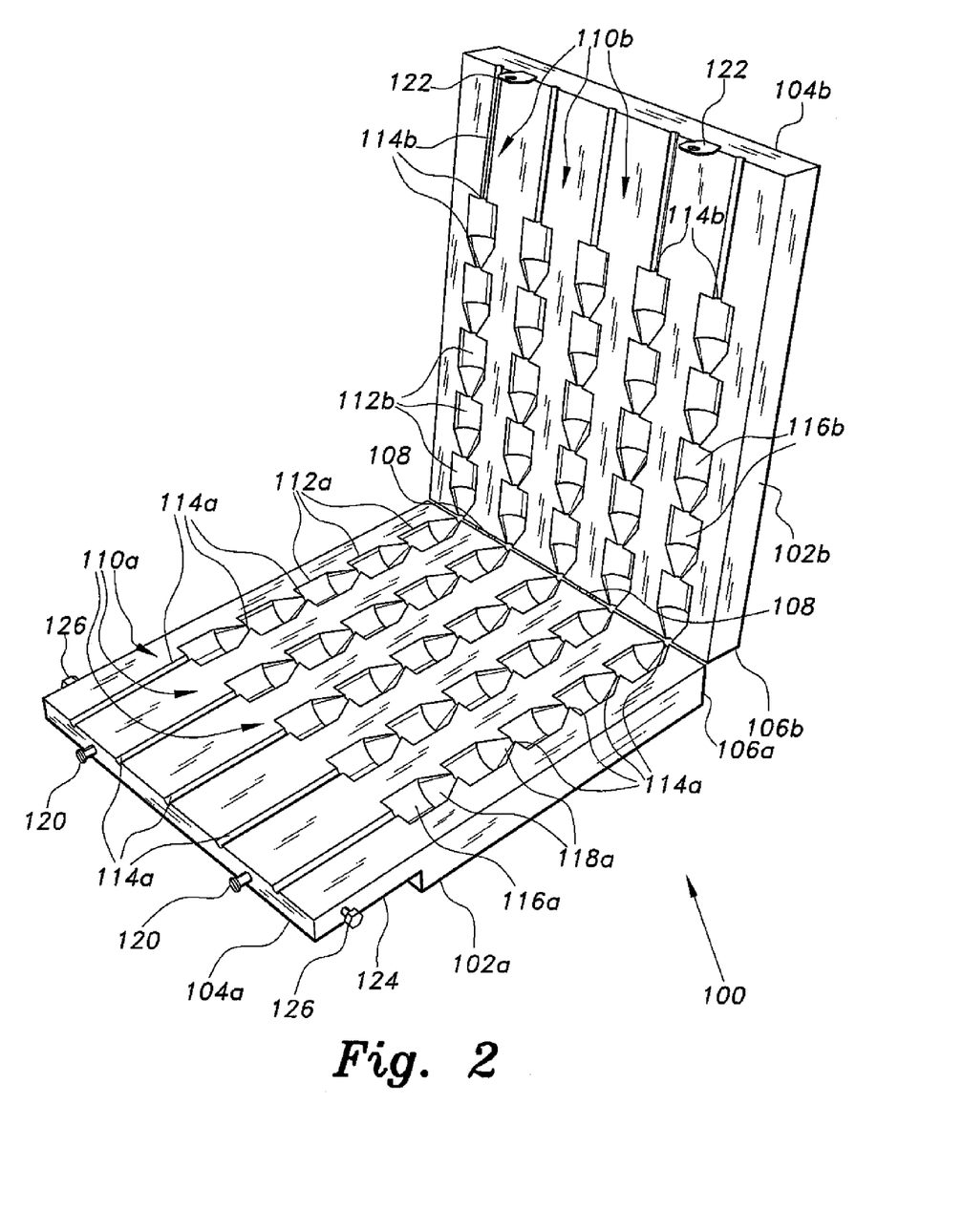
FIG. 2 is a perspective view of the tray component of the food skewering machine according to the present invention, the tray component being opened to show its internal configuration.

FIG. 2 provides a detailed perspective view of the tray 100 that is the other basic component (i.e., other than the base 10) of the food skewering machine 10. The tray 100 includes a first tray half 102a and a second tray half 102b. The two tray halves are substantially identical to one another (excepting certain details), with the two halves being substantially mirror images of one another, as can be seen in FIG. 2. Each half 102a and 102b has a skewer insert end, respectively 104a and 104b, and an opposite hinge end, respectively 106a and 106b, with the two halves 102a, 102b being connected to one another by hinges 108 at their hinge ends 106a and 106b. Each tray half includes a plurality of food receptacle rows therein, with each row containing a plurality of food receptacles and skewer channels disposed therealong from the skewer insert end 104a, 104b to the opposite hinge end 106a, 106b, with the receptacles and channels in alternating order in each row. In FIG. 2 the food receptacle rows are designated as rows 110a and 110b in each respective tray half 102a and 102b, with the food receptacles being similarly designated as receptacles 112a and 112b and the skewer channels as 114a and 114b. The "a" and "b" characters are deleted in FIGS. 4 through 6 where the two tray halves 102a, 102b and their food receptacle rows 110, food receptacles 112, and skewer channels 114 are shown closed.

Figure 4:
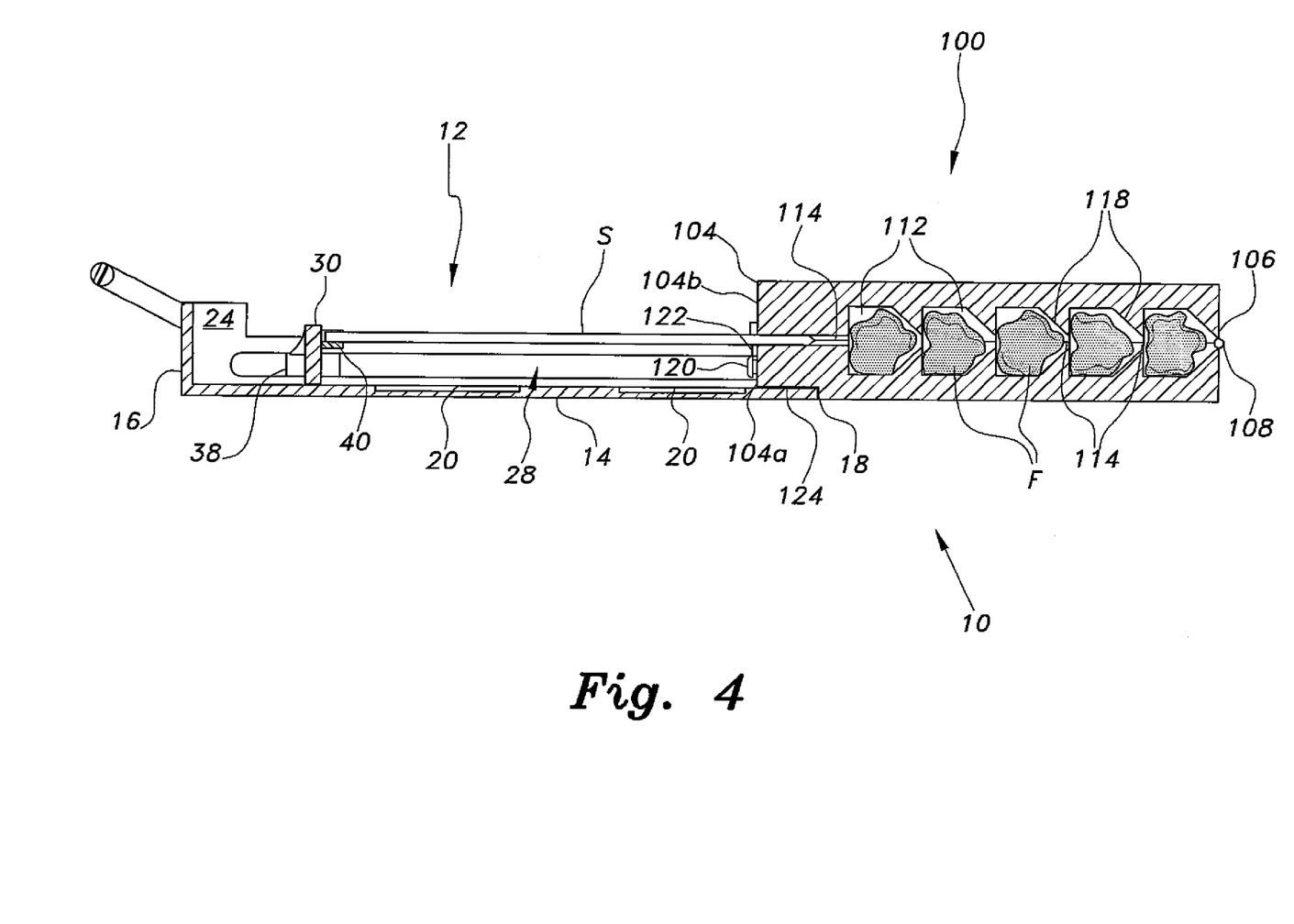
FIG. 4 is a side elevation view in section of the food skewering machine according to the present invention, illustrating the placement of skewers in the machine.
Figure 5:
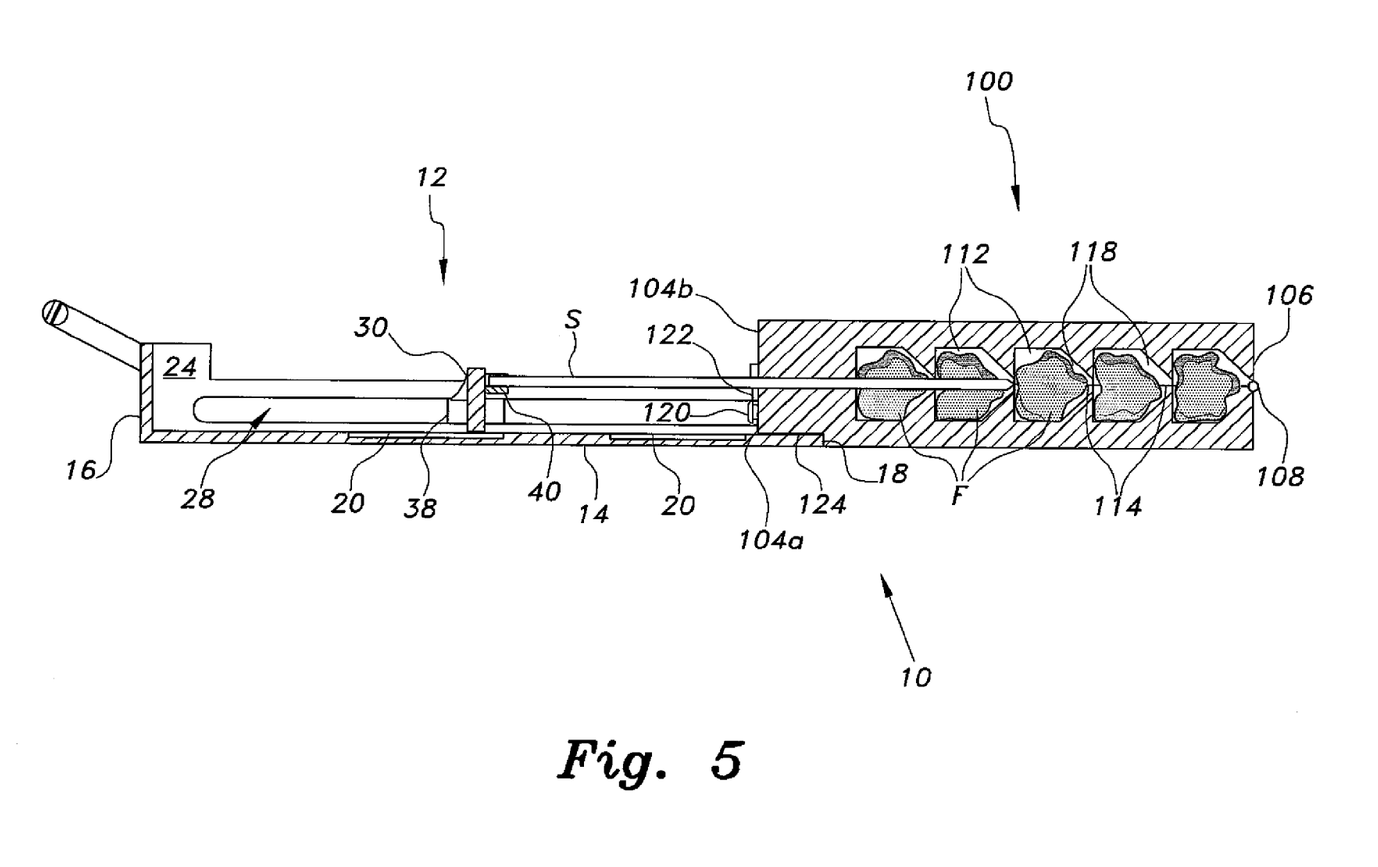
FIG. 5 is a side elevation view in section of the food skewering machine according to the present invention, illustrating an intermediate skewer position in the skewering operation.
Figure 6:
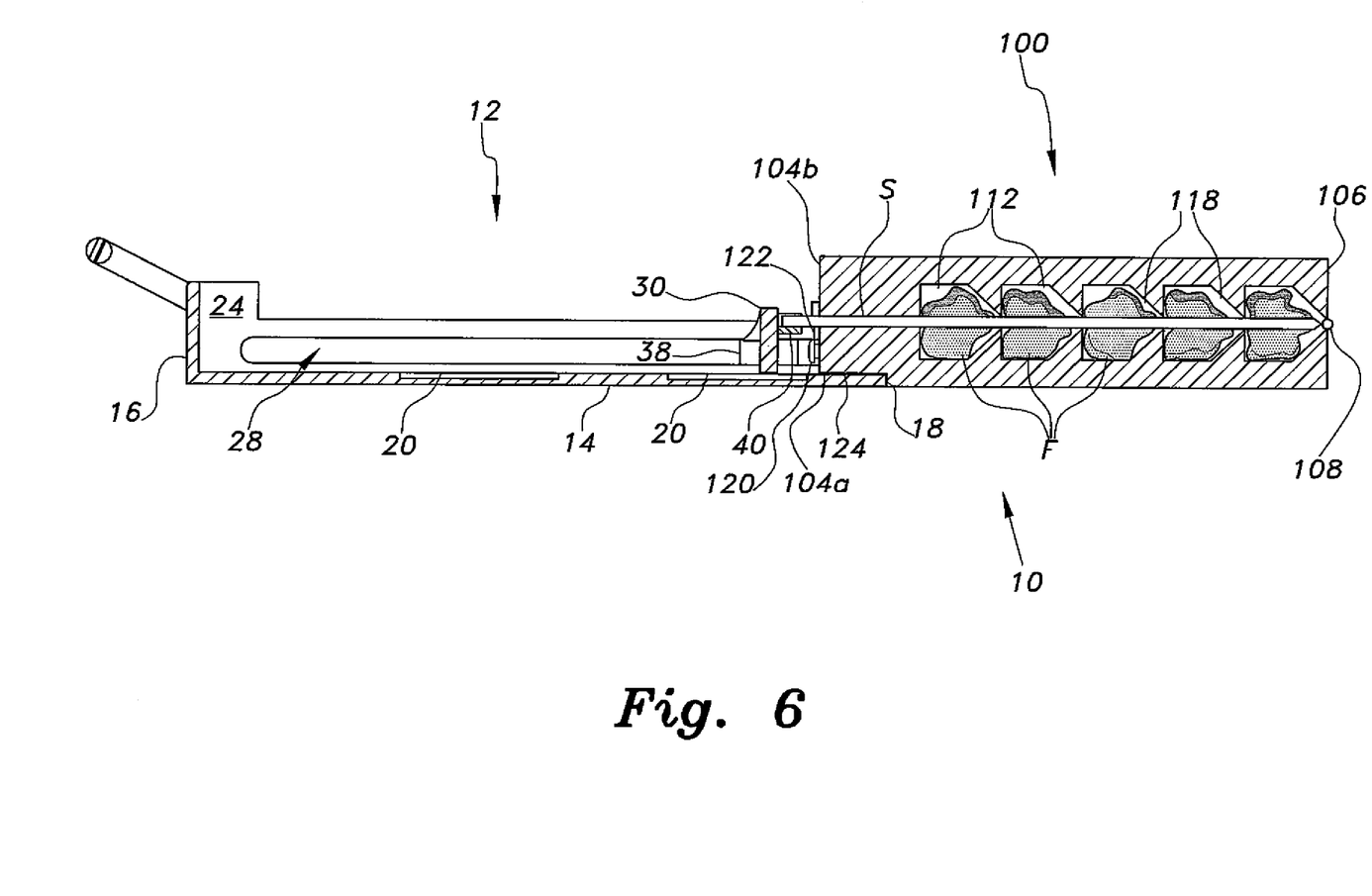
FIG. 6 is a side elevation view in section of the food skewering machine according to the present invention, illustrating the completion of the skewering operation.

More specifically, each of the food receptacles 112a, 112b of the two tray halves 102a, 102b comprises a semicylindrical portion, respectively 116a and 116b, with a semi conical skewer guide portion, respectively 118a, 118b, extending from the semicylindrical portion toward the hinge end 106a, 106b of each tray half 102a, 102b. When the tray 100 is closed as shown in FIGS. 4 through 6, each of the food receptacles comprises a cylindrical main portion 116 with a conical skewer guide portion 118. Each of the skewer channels 114a, 114b (or 114 for the closed tray 100 of FIGS. 4 through 6) has a relatively long entry portion extending from the skewer insert ends 104a, 104b of the tray halves 102a, 102b to an adjacent food receptacle and between the semi conical skewer guide portion 118a, 118b and the semicylindrical portion 116a, 116b of adjacent food receptacles along each of the rows 110a, 110b in each tray half. While five food receptacle rows 110a, 110b are shown in each tray half with each row containing five food receptacles 112a, 112b, it should be understood that more or fewer rows and/or more or fewer receptacles along each row may be provided as desired.

Figure 3:
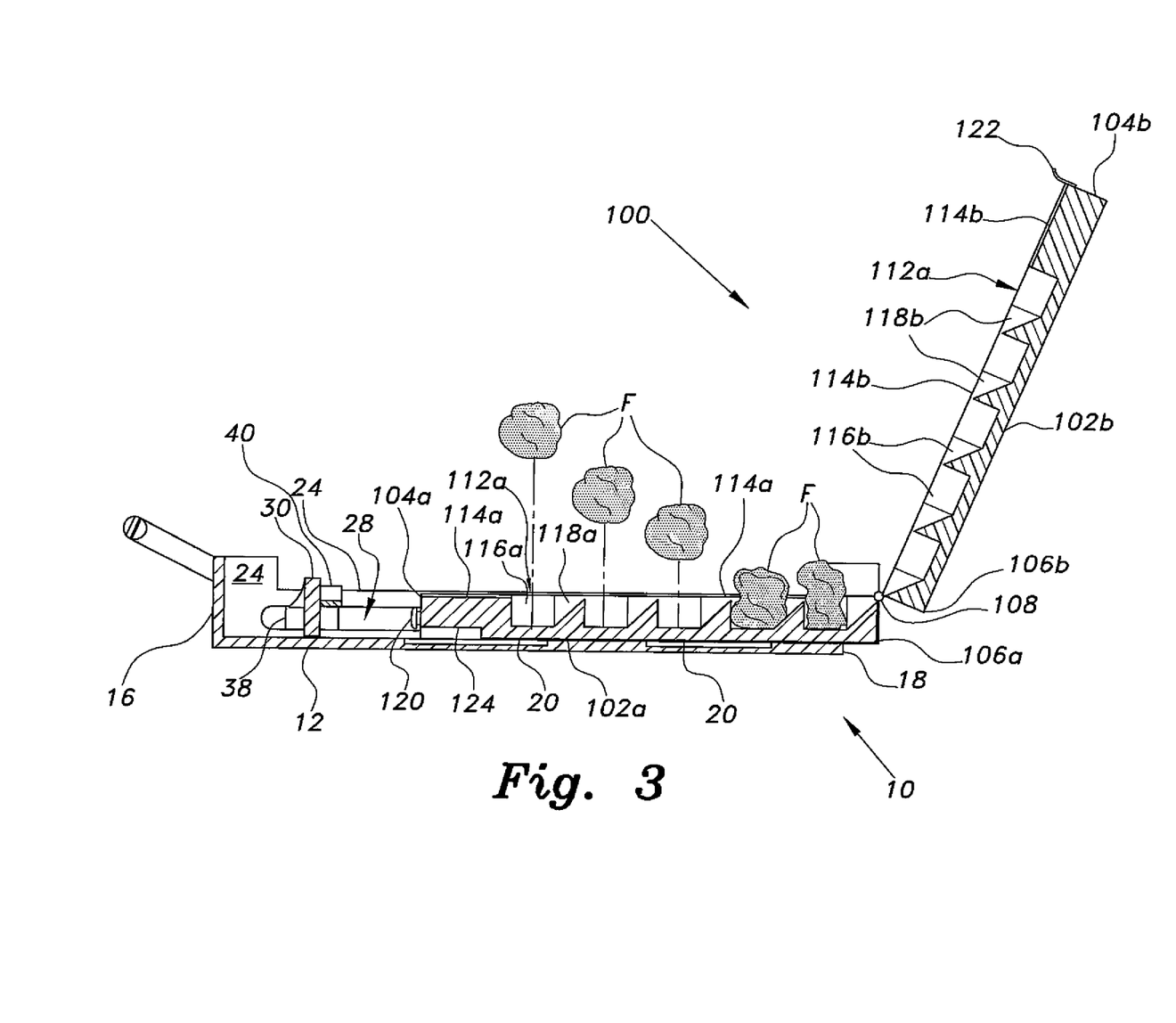
FIG. 3 is a side elevation view in section of the food skewering machine according to the present invention, illustrating the initial step of placing pieces of food therein.

FIGS. 3 through 7 are side elevation views in section illustrating the operation of the food skewering machine 100. The initial step is shown in FIG. 3, with a series of food pieces or elements F being placed in corresponding first food receptacles 112a of the first tray half 102a of the open tray 100. The skewer driver 30 is positioned as close as possible, or nearly so, to the handle end 16 of the base 12 at this stage of the operation. The food pieces F are preferably cut or otherwise selected or formed to have lateral dimensions or diameters approximately equal to the width of each food receptacle 112a, i.e., approximately equal to the diameter of each closed food receptacle 112 as shown in FIGS. 4 through 6. The specific type of food used is not critical, so long as each piece or element has sufficient body to remain in place upon a skewer once the skewer has been passed through the food piece or element F. The food F may be pieces of meat, vegetables, and/or any other suitable food as desired.

In FIG. 4, the two tray halves are shown secured together at their skewer insert ends to form the closed tray 100, and skewers S have been placed with their blunt ends resting in the skewer rests 40 of the skewer driver 30 and their sharpened ends resting in the first portions of the skewer channels 114 adjacent the skewer insert end 104 of the tray 100. The tray securing means may comprise pins or buttons 120 extending from the skewer insert end 104a of the first tray half 102a that engage cooperating tabs 122 that extend from the skewer insert end 104b of the second tray half 102b, as shown more clearly in FIGS. 2 and 3, or other securing or latching means as desired. It will be seen that one food piece or element F is positioned within each of the closed cylindrical food receptacles 112. However, it should be noted that it is not necessary to fill each of the receptacles along any given row or rows of receptacles. The five food pieces F shown in the five receptacles 112 in FIGS. 4 through 6 are exemplary. In FIG. 4 the closed tray 100 has been moved from its storage position within the base 12 to its operating position where it engages the tray end 18 of the base 12. The first tray half 102a has a notch or relief 124 formed in its bottom or outer surface adjacent its skewer insert end 104a. The notch or relief 124 fits over the tray end 18 of the base 12, or more specifically over the floor 14 at that end 18 of the base 12 when the tray 100 is in its operating position. Movement of the tray 100 away from the base 12 is prevented by the two lateral pins or fasteners 126 that extend from each side of the first tray half 102a near its skewer insert end 104a, shown in FIG. 2. These pins 126 engage the corresponding notches at the ends 42 of the two slots 26 and 28 in the walls 22 and 24 of the base (shown in FIG. 1) to seat therein. The increased depths of the notches at the ends 42 of the two slots 26 and 28 allow the pins or fasteners 126 to drop down to compensate for the thickness of the floor 14 of the base 12, as the tray 100 extends beyond the base 12 in its operating position. This arrangement, along with the notch or relief 124 of the lower tray portion or half 102a, prevents the tray 100 from moving relative to the base 12 during operation of the food skewering machine 10.

FIG. 5 is quite similar to FIG. 4 with the exception being that the skewer driver 30 has been pushed to the right in the base 12, thereby driving the skewers S to the right along the skewer channels 114 of the closed tray 100. As the pieces of food F are captured within their respective food receptacles 112, they cannot move relative to the tray 100 and are thus impaled by the sharp ends of the skewers S as they are advanced through the closed tray 100. The conical shapes of the skewer guide portions 118 of the food receptacles 112 serve to maintain the alignment of the sharpened ends of the skewers S with the concentric skewer channels 114 in the event that the skewers S are deflected by some non-concentric tougher portion of one or more of the food pieces F.

FIG. 6 shows the completion of the skewering portion of the operation of the food skewering machine 10. In FIG. 6, the skewer driver 30 has been pushed completely to the right, adjacent to the skewer insert end 104 of the tray 100. This has driven the skewers S a corresponding distance along the skewer channels 114, with skewers S of the proper length being driven completely through all of the food receptacles 112 within the closed tray 100 and any pieces of food F captured therein.

Figure 7:
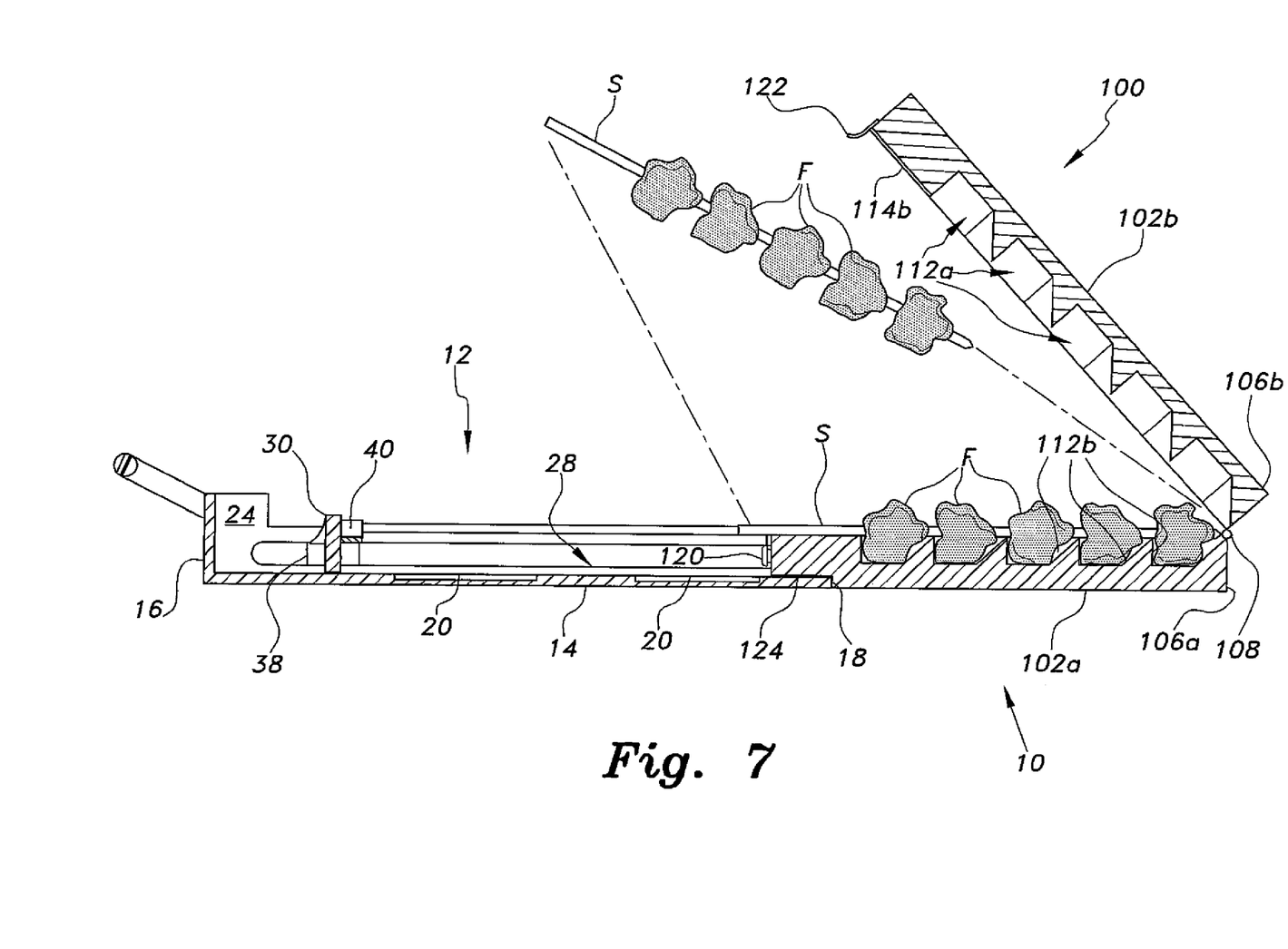
FIG. 7 is a side elevation view in section of the food skewering machine according to the present invention, illustrating the removal of the skewers and food impaled thereon from the tray component.

FIG. 7 illustrates the final step in the operation of the food skewering machine 10. In FIG. 7 the tray 100 has been opened to withdraw the skewers S with the food pieces F impaled thereon, with one skewer S and food F thereon shown separated from the opened tray 100 and another skewer S and its food F remaining in the lower half 102a of the tray 100. The skewer driver 30 has been moved back to its initial or starting position along the slots (slot 28 being shown in FIG. 7) near the handle end 16 of the base 12.

Figure 8:
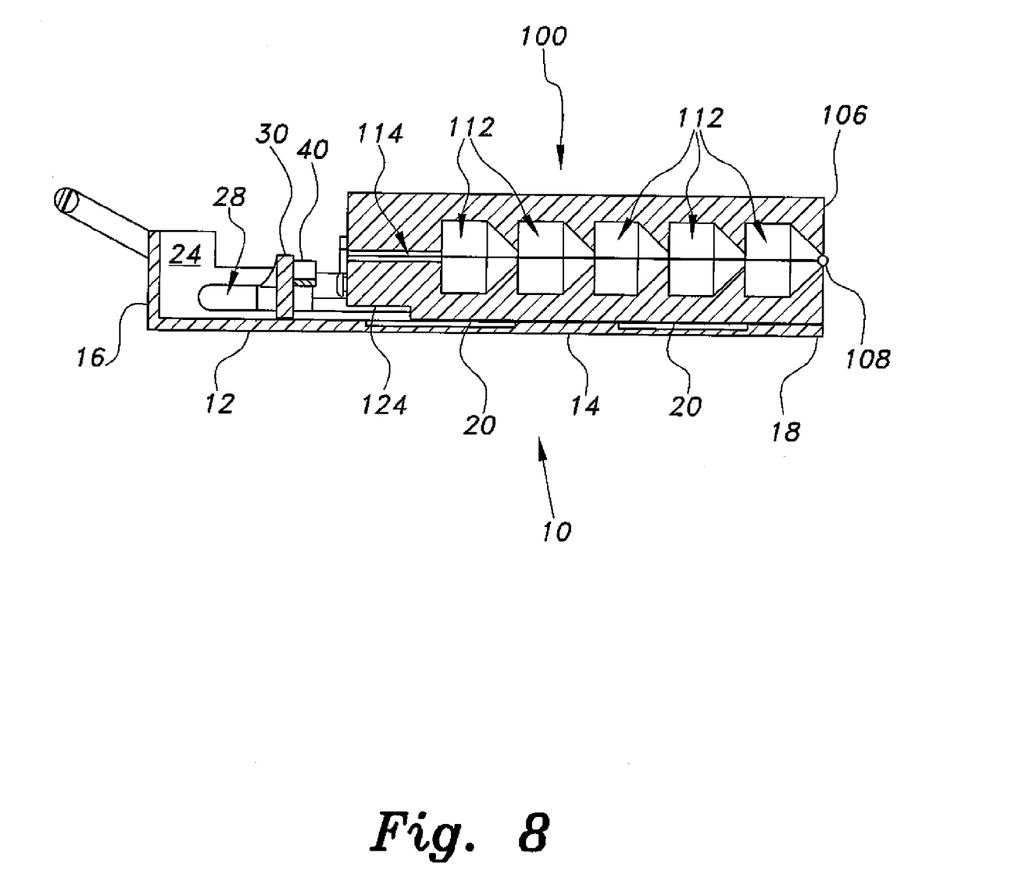
FIG. 8 is a side elevation view in section of the food skewering machine according to the present invention, illustrating the containment of the tray component within the base component of the device for compact storage of the assembly.

When all of the skewers S and food F impaled thereon have been removed, the food skewering machine 10 may be cleaned and configured for storage for future use. The food skewering machine 10, and particularly the base 12, its skewer driver 30, and both halves of the tray 100, are preferably formed of food grade plastic in order to facilitate cleanup and sanitation. However, other materials may be used if so desired, e.g., corrosion resistant ("stainless") steel, etc. Once the cleanup has been completed, the tray 100 may be lifted slightly from its deployed position in the base 12 as shown in FIGS. 4 through 7 to disengage the pins or fasteners 126 of the tray 100 (FIG. 2) from the notches in the ends 42 of the two slots 26 and 28 of the base 12 (FIG. 1) and to disengage the notch 124 of the tray 100 from the tray end 18 of the base 12. The closed tray 100 may then be placed atop the floor 14 of the base 12 for compact storage of the food skewering machine 100 until needed for further use, as shown in FIG. 8.

It is to be understood that the present invention is not limited to the embodiments described above, but encompasses any and all embodiments within the scope of the following claims.

I claim:

1. A food skewering machine, comprising:
   a base having a floor, a handle end, a tray end opposite the handle end, and mutually opposed first and second lateral walls, each of the lateral walls having a skewer driver guide slot disposed therealong;
   a skewer driver disposed within the base, the skewer driver extending laterally across the base between the first and second lateral walls, the skewer driver having mutually opposed ends, each of the ends of the skewer driver communicating with a corresponding skewer driver guide slot of the base, and the skewer driver including a plurality of semicylindrical skewer rests extending toward the tray end of the base, each of the skewer rests including an open, concave seat for receiving a blunt end of a skewer;
   a retainer attached to each of the ends of the skewer driver for retaining the skewer driver ends in the skewer driver guide slot; and
   a tray having a skewer insert end, a hinge end opposite the skewer insert end, and a plurality of food receptacles and skewer channels disposed therein, the tray selectively engaging the tray end of the base;
   wherein the skewer driver is selectively displaced horizontally between the handle end and the tray end of the base, thereby moving any skewers by pushing the blunt ends disposed in the skewer rests toward the skewer insert end of the tray.

2. The food skewering machine according to claim 1, wherein the tray further comprises a first tray half and a second tray half, the first tray half being hingedly connected to the second tray half at the hinge end, the first tray half further having a relief defined across the skewer insert end for selectively engaging the tray end of the base.

3. The food skewering machine according to claim 1, wherein the tray further comprises a first tray half and a second tray half, the first tray half being a mirror image of the second tray half, each tray half being hingedly connected to the other tray half at the hinge end of the tray, each tray half further having a plurality of food receptacle rows disposed therein, each of the rows having a plurality of food receptacles and a skewer channel disposed therealong.

4. The food skewering machine according to claim 1, wherein each of the food receptacles comprises a semicylindrical portion and a semi conical skewer guide portion extending from the semicylindrical portion toward the hinge end of the tray.

5. The food skewering machine according to claim 1, further comprising a plurality of liquid capture receptacles disposed in the floor of the base.

6. The food skewering machine according to claim 1 wherein the base, the skewer driver, and the tray are formed of food grade plastic.

7. A food skewering machine, comprising:
   a base having a floor, a handle end, a tray end opposite the handle end, and mutually opposed first and second lateral walls;
   a skewer driver disposed within the base, the skewer driver extending laterally across the base between the first and second side walls, the skewer driver having mutually opposed ends;
   a keeper attached to each end of the mutually opposed ends of the skewer driver; and
   a tray having a skewer insert end, a hinge end opposite the skewer insert end, and a plurality of food receptacles and skewer channels disposed therein, the tray further comprising a first tray half and a second tray half hingedly attached to the first tray half at the hinge end, the first tray half further having a relief defined across the skewer insert end for selectively engaging the tray end of the base;
   wherein the skewer driver is selectively displaced horizontally between the handle end and the tray end of the base.

8. The food skewering machine according to claim 7, wherein:
   each of the lateral walls of the base has a skewer driver guide slot disposed therealong; and
   wherein each of the ends of the skewer driver communicating with a corresponding guide slot of the base, and each keeper retains each respective one of the ends in the corresponding skewer driver guide slot.

9. The food skewering machine according to claim 8, wherein the skewer driver further comprises a plurality of semicylindrical skewer rests extending toward the tray end of the base, each of the skewer rests including an open, concave seat for receiving a blunt end of a skewer.

10. The food skewering machine according to claim 8 wherein the base, the skewer driver, and the tray are formed of food grade plastic.

11. The food skewering machine according to claim 7, wherein the first tray half is a mirror image of the second tray half, each tray half further having a plurality of food receptacle rows disposed therein, the plurality of food receptacles and skewer channels being disposed along each row.

12. The food skewering machine according to claim 7, wherein
   each of the food receptacles comprises a semicylindrical portion and a semi conical skewer guide portion extending from the semicylindrical portion toward the hinge end of the tray.

13. The food skewering machine according to claim 7, further comprising a plurality of liquid capture receptacles disposed in the floor of the base.

14. A food skewering machine, comprising:
   a base having a floor, a handle end, a tray end opposite the handle end, and mutually opposed first and second lateral walls;
   wherein each of the lateral walls of the base include a skewer driver guide slot;
   a skewer driver is disposed within the base, the skewer driver extending laterally across the base between the first and second lateral walls, the skewer driver having mutually opposed ends, each of the ends of the skewer driver communicating with a corresponding guide slot of the base, and a plurality of semicylindrical skewer rests extending toward the tray end of the base, each of the skewer rests includes an open concave seat for receiving a blunt end of a skewer; and a tray having a skewer insert end and a hinge end opposite the skewer insert end, the tray further comprising a first tray half and a second tray half, the first tray half being a mirror image of the second tray half, each tray half being hingedly connected to the other tray half at the hinge end of the tray, each tray half further having a plurality of food receptacle rows disposed therein, each of the rows having a plurality of food receptacles and a skewer channel disposed therealong, the first tray half further having a relief defined across the skewer insert end thereof for selectively engaging the tray end of the base;

wherein the skewer driver is selectively displaced horizontally between the handle end and the tray end of the base, along each of the skewer driver guide slots.

15. The food skewering machine according to claim 14, wherein the base, the skewer driver, and the tray are formed of food grade plastic.

16. The food skewering machine according to claim 14, wherein each of the food receptacles comprises a semicylindrical portion and a semi conical skewer guide portion extending from the semicylindrical portion.

17. The food skewering machine according to claim 14, further comprising a plurality of liquid capture receptacles disposed in the floor of the base.

\* \* \* \* \*